United States Patent [19]

Anderson

[11] Patent Number: 4,621,446
[45] Date of Patent: Nov. 11, 1986

[54] FISHING RIG

[76] Inventor: Malon Anderson, P.O. Box 460, Hot Springs, S. Dak. 57747

[21] Appl. No.: 816,293

[22] Filed: Jan. 6, 1986

[51] Int. Cl.[4] ............................................. A01K 97/12
[52] U.S. Cl. ......................................................... 43/17
[58] Field of Search ......................... 43/15, 16, 17, 19.2

[56] References Cited

U.S. PATENT DOCUMENTS

| | | | |
|---|---|---|---|
| 380,899 | 4/1888 | Jones | 43/17 |
| 1,451,124 | 4/1923 | Stolze | 43/16 |
| 1,741,253 | 12/1929 | Skelton et al. | 43/17 |
| 1,777,496 | 10/1930 | Killory | 43/17 |
| 3,134,188 | 5/1964 | Petersen | 43/17 |
| 3,190,026 | 6/1965 | Roszak | 43/17 |
| 3,578,748 | 5/1971 | Hurd | 43/17 |
| 4,567,686 | 2/1986 | Akom | 43/17 |

Primary Examiner—M. Jordan
Attorney, Agent, or Firm—Merchant, Gould, Smith, Edell, Welter & Schmidt

[57] ABSTRACT

A fishing rig is disclosed, comprising a flat circular base member sized to cover a hole formed through an ice layer. A frame member is secured to the base member and a reel having a central spool portion disposed between opposing end points is mounted on the frame member for rotation about a horizontal axis. A signal mechanism is disposed on a pivot rod which is pivotally supported on the frame member at a pivot point. A first end of the rod is provided with a signal and a second end of the rod is provided with weights for biasing the rod to pivot toward a signal position. Hooks are carried on the reel at a plurality of readily displaced positions and a hook engaging pin extends from the rod and is captured within a hook when the rod is pivoted to a second position with the signal member in a lowered state. The fishing rig is made of lightweight rigid material and is sized to be engaged by an operator to play a baited fish.

7 Claims, 5 Drawing Figures

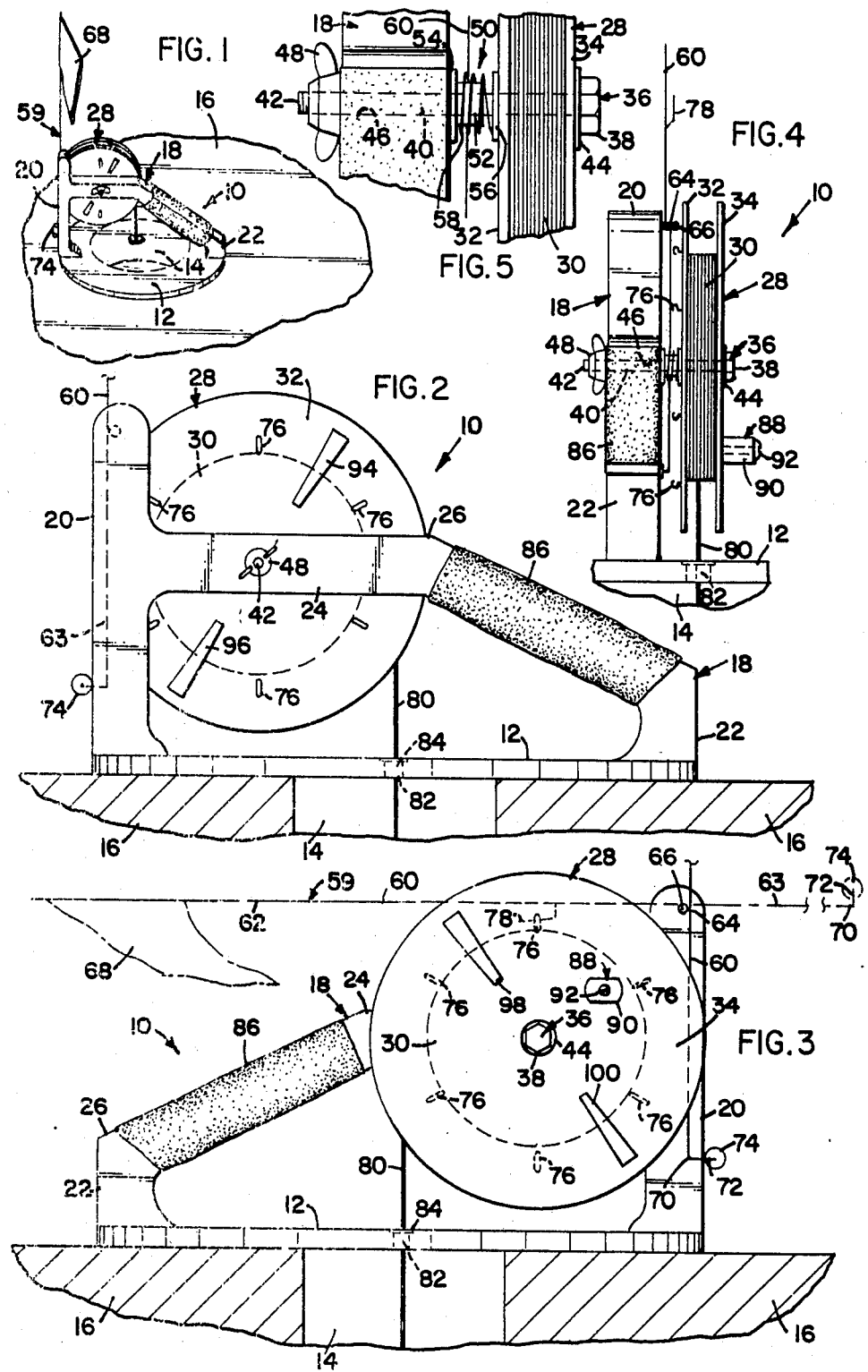

FISHING RIG

BACKGROUND OF INVENTION

1. Field of the Invention

This invention pertains to fishing rigs and more particularly ice fishing rigs which are portable and include means for signalling the running of a fishing line.

2. Description of the Prior Art

Winter sport fishing in cold climates has long been a popular pastime. The sport has developed special equipment to address the particular needs of the winter sport fisherman. Notably, the casting reel and rod used by the sport fisherman in summer months had been replaced by fishing rigs which are baited and left unattended until a fish takes the bait and triggers a signalling device. Such rigs permit the winter sport fisherman to disperse a plurality of baited lines through separate holes in the ice cover and to retreat to the shelter of a fishing shanty until a fish takes one of the baited lines and triggers a signal.

Through the years, the art has developed a wide variety of ice fishing rigs, each with its own advantages and disadvantages. A common disadvantage of many of the prior art fishing rigs is they lack the flexibility and control which a sport fisherman enjoys with his summer rod and casting reel. Such maneuverability of an ice fishing rig would be desirable to permit the winter sport fisherman to play a fish which has taken the bait. Also, there is a continual need to develop more improved signalling mechanisms. Prior art signalling mechanisms include flags which are automatically moved to a signalling position when the bait is taken. It is desirable to improve this concept to provide a flag mechanism which will be reliably and quickly moved to a signalling position in time to alert the sport fisherman to use the rig to effectively play the baited fish.

Another problem associated with prior art ice fishing rigs is that the flag signalling mechanisms are not readily visible except in the light of day. When fishing in the morning hours or evening hours when the winter sun has set, it is often impossible to visually detect the flag in the signal position.

Finally, any ice fishing rig must be inexpensive and easy to manufacture as well as provide ease of transportation and storage. This is particularly true since it is common for the winter sport fisherman to want to deploy numerous rigs during a fishing outing.

OBJECTS AND SUMMARY OF THE PRESENT INVENTION

It is an object of the present invention to provide an ice fishing which is lightweight and easy to transport and store.

A further object of the present invention to provide an ice fishing rig which is maneuverable and provides a fisherman with opportunity to play a baited fish.

A yet further object of the present invention is to provide an ice fishing rig with improved means for signalling a fisherman that bait has been taken.

According to a preferred embodiment of the present invention, an ice fishing rig is provided comprising a base member sized to cover a hole of predetermined size formed through an ice layer. A reel having a central spool portion disposed between opposing end plates is mounted on the frame member for rotation about a horizontal axis. A hole is formed through the base member and disposed directly beneath a radial edge of the spool. A signal mechanism is disposed on a pivot rod which is pivotally supported on a frame member at a pivot point. The rod has a first end which extends from the pivot point to the signal member and a second end which extends from the pivot point to a free end. Biasing means urge the rod to pivot toward a signal position. Hooks are carried on the reel at a plurality of radially displaced positions. A hook engaging pin extends from the rod and is captured within the hook when the rod is pivoted to a second position with the flag in a lowered state.

BRIEF DESCRIPTION OF THE DRAWINGS

FIG. 1 is a perspective view of the fishing rig according to the present invention;

FIG. 2 is a side view taken in an elevation of the fishing rig of FIG. 1;

FIG. 3 is a side view taken in elevation of the fishing rig on a side opposite that of FIG. 2;

FIG. 4 is an end view taken in elevation of the fishing rig of the present inventon; and FIG. 5 is an enlarged view showing means for mounting a reel of the fishing rig to a frame member.

DESCRIPTION OF THE PREFERRED EMBODIMENT

Referring now to the figures, a ice fishing rig according to the present invention is shown generally at 10. The rig includes a flat circular plate or base member 12. The base member is sized to have a diameter such that it will cover a hole 14 of predetermined size formed through an ice layer 16. For inland winter sport fishing a diameter of 12 inches is sufficient. To provide greatest maneuverability for the ice rig 10 as will be described, the diameter of the base member 12 is preferably kept as small as possible but great enough to extend completely over the hole formed through the ice so as to insure that snow and ice chips do not fall into the hole 14 and obstruct it.

A frame member 18 extends vertically away from the base member 12. For purposes of this description, references as to vertical displacement will be with reference to a fishing rig 10 placed on top of an ice layer 16 as shown in the figures. The frame member includes first and second spaced apart vertical members 20 and 22, respectively. As can be seen in FIGS. 2 and 3, vertical member 20 has a vertical dimension greater than that of member 22. A horizontal member 24 extends from vertical member 20 and terminates with an angled member 26 joining horizontal member 24 and second vertical member 22 to complete the frame member 18.

The fishing rig 10 further includes a reel 28 which comprises a central cylindrical spool 30 disposed between two opposing and axially aligned end plates 32 and 34.

As will be more fully described, the fishing rig 10 of the present invention is a fishing device which may be set and activated by a baited fish. Also, the device is intended to be sufficiently maneuverable to allow a fisherman to play a baited fish. To this end, the rig is made as light as possible. Accordingly, base member 12 and frame 18 are made from lightweight rigid material. A preferable material would be particle board where the frame member 18 is secured to the base 12 through any suitable means such as glue, screws or other fastening means. The reel 28 is formed with the spool 30 cut from particle board with Masonite end plates 32, 34 glued to its axial surfaces.

Shown best in FIG. 5, a reel 28 is mounted to the frame member by means of a bolt 36 having a head 38 separated from end plate 34 by a washer 44. The bolt shaft 40 extends through the axial center of the reel 28 and passes through a shaft receiving bore 46 formed in horizontal member 24 of frame 18. The bolt 36 and bore 46 are sized and aligned for the bolt shaft 40 to extend past the horizontal frame member 24 and terminate at a threaded end 42. A wing nut 48 is received on the threaded end 42 and captures the bolt 36 and reel 28 onto the horizontal frame member 24. The bolt shaft 40 provides an axis of rotation for reel 28 with the axis being horizontal and perpendicular to the plane of the frame member 18.

Shown best in FIG. 5, a reel tensioning mechanism 50 is shown. The tensioning mechanism 50 includes a cylindrical spacer 52 disposed surrounding shaft 40 between a pair of shaft surrounding washers 54 and 56 abutting frame member 24 and end plate 32 respectively. A compression spring 58 is provide surrounding the spacer 52. The ends of compression spring 58 engage washers 54 and 56 urging them and reel 46 and frame member 24 apart.

Shown exaggerated in FIG. 5, the spacer 52 has an axial dimension less than the distance between washers 54 and 56. The axial dimension of this space may be varied by turning wing nut 48. As the space increases, the force of the spring 58 acting on the reel 28 is reduced. Accordingly, the reel 28 may rotate more freely. To provide resistance to rotation, the nut 48 can be turned in the opposite direction thereby compressing spring 58 with an attendant increase in friction between rotating and nonrotating parts of the rig. If wing nut 48 is turned such that the reel is drawn towards the frame with the washer 56 abutting spacer 52, the reel is locked and is not freely rotatable. In this position the reel 28 is spaced from the frame member 18 by a fixed distance equal to the axial dimensions of washers 54 and 56 and spacer 52.

The space between the opposing surfaces of the frame 18 and end plate 32 accommodate means for signalling a fisherman if a fish has taken a bait. The signalling mechanism 59 includes a rod member 60 which is preferably formed of a steel wire having its central portion 64 loosely wrapped around a pivot 66 such as a screw or other suitable member fixed to first vertical member 20 (best shown in FIG. 4). A first side 62 of the rod 60 extends from the pivot point 66 to a signalling means such as a flag 68. A second side 63 of the rod 60 extends away from the pivot point 66 in a diametrically opposite direction and terminates at a free end 70. The free end 70 of the rod 60 is provided with a band 72 such that the rod 60 will oppose a surface of the vertical member 22. The bent portion 72 of the rod 60 is provided with a weight 74. Weight 74, urges the rod 60 to pivot about point 66 to a signal position shown by the solid lines in FIGS. 1, 3 and 4. Weight 74 opposes vertical member 20 in abutting relation. Wind forces which act on flag 68 and tend to pivot the signalling mechanism 59 to a down position (shown by the dotted line in FIG. 3) are opposed by the counteracting force of weight 74. When forces attempt to pivot the signalling mechanism 59 past the signal position, further movement of the mechanism 59 is opposed by the blocking relation of weight 74 and vertical member 20.

On the surface of end plate 32 opposing frame 18, a plurality of hook members 76 are provided. Best shown in FIG. 4, the hook members are radially displaced about surface 32 with each of the hook members 76 having an opening opposing the axis of reel 28. With reference to FIGS. 3 and 4, the rod 60 is provided with an L-shaped pin 78 secured thereto by any simple means such as welding or soldering. The pin 78 and hooks 76 are disposed such that pin 78 is received within a hook 76 when the signal mechanism 60 is in the down position a shown by the dotted lines of FIG. 3.

A monofilament fish line 80 is wrapped around the spool 30 in a counterclockwise opening spiral when viewed in FIG. 3 with the line 80 extending from a radial edge of the spool 30 downwardly through a hole 82 aligned with the radial edge over the ice hole 14. Hole 82 may be formed directly through base member 12 but may be provided with an upper enlarged bore 84 such that hole 82 may be provided with a plug of nylon or other smooth plastic material to protect line 80. Hole 82 is made small to prevent ice and snow from passing through hole 82 and clogging ice hole 14.

The angled member 26 of frame 18 is provided with a grip surface 86 of leather or synthetic rubber or the like sized to be recieved in the hand of a fisherman. A reel crank handle 88 is provided on end plate 34 and comprises a generally cylindrical handle member 90 having an axial bore therethrough with the member 90 rotatably secured to plate 34 by a bolt 92 extending through the bore and engaging end plate 34. Both of end plates 32 and 34 are provided with a pair of diametrically opposed light reflecting surfaces 94, 96, 98 and 100.

In operation, the ice fishing rig of the present invention provides many advantages not previously enjoyed in the art. The base member 12 covers ice hole 14 and prevents ice, snow and other debris from entering the hole 14 and obstructing it. The reel tensioning mechanism 50 provides for selective adjustment of the amount of resistance to rotational movement of the reel 28. This is advantageous to prevent false signals of a baited fish. Particularly, in the case of using live bait, the tensioning mechanism can be adjusted to a tension such that the reel will not rotate under the movement of the bait or under movement of a potential prey nibbling on a bait. However, the reel 28 would be rotatable upon hooking the prey. As the prey draws line 80 from the reel, the reel 28 will rotate and the hook 76 will slip off of pin 78. At this point, by reason of the urging of weight 74, the signal mechanism 59 will pivot to an up position with the flag 68 indicating a baited fish. The weight 74 opposing the vertical member 20 insures that wind does not blow the signal mechanism 59 to a down position even though a fish has been baited. In addition to the signal mechanism 59, the rotation of the reel 18 results in rotating reflective surfaces due to the rotation of the fluorescent tape members 94 through 100. This is particularly advantageous in night fishing where rotation of a reel is not readily apparent. Moonlight and other sources of light reflect off snow and ice onto the tapes 94, 96, 98, and 100 and their movement is readily visible by a fisherman.

When the signal mechanism 59 indicates a fish has been baited, a fisherman may grasp the grip element 86 in one hand and the handle 88 in another. Due to the lightweight and compact structure of the present invention, and due to the location of the grip member 86 and handle 88, a fisherman can play the fish in a manner quite similar to playing a fish with a casting reel to provide greater success in catching the baited fish. The enlarged diameters of plates 32 and 34 compared to the diameter of spool 30 eliminates take up problems with the fish line 80.

From the foregoing, it can be seen how the objects of the present invention have been obtained in a preferred manner. However, modifications and equivalents of the disclosed concepts will occur to those skilled in the art are to be included within the scope of the invention. Accordingly, it is intended that the invention only be limited by the scope of the claims as are appended hereto.

What is claimed is:

1. An ice fishing rig comprising:
   a flat base member sized to cover a hole of predetermined size formed through an ice layer;
   a frame member secured to said base member;
   a reel having a central spool disposed between opposing end plates;
   means for mounting said reel with said spool having an axis rotatable about a horizontal axis;
   a hole formed through said base member and aligned with a radial edge of said spool;
   signal means disposed on a pivot rod;
   means for pivotally supporting said pivot rod at a pivot point on said base member with said rod extending from said point in one direction to said signal means and extending from said point to a free end of said rod in an opposing direction;
   biasing means for urging said rod to pivot toward a signalling position; and
   means for releasably securing said rod in a second position comprising hook means carried on said reel and a hook engaging pin secured to said rod and extending therefrom and captured within said hook means when said rod is pivoted to said second position.

2. An ice fishing rig according to claim 1 wherein said means for mounting said reel includes a pivot rod extending between said reel and said frame with said reel pivotal on said rod;
   a spacer surrounding said rod between said frame and said reel;
   spring means extending between said frame and said reel, urging said reel away from said frame;
   means for drawing said reel toward said frame with said spacer limiting movement of said reel.

3. An ice fishing rig according to claim 1 wherein said biasing means comprises a weight secured to said free end of said rod and disposed opposing a surface of said frame when said rod is in said signal position.

4. An ice fishing rig according to claim 1 wherein said reel is provided with movement indicating means.

5. A maneuverable ice fishing rig comprising:
   a flat base member sized to cover a hole of predetermined size formed through an ice layer;
   a frame member secured to said base member;
   a reel having a central spool disposed between opposing end points;
   means for mounting said reel to said frame member with said spool havng an axis rotatable about a generally horizontal axis of rotation when said base member is disposed on an ice layer;
   a hole formed through said base member beneath a radial edge of said spool and sized to provide passage for a fishing line;
   a rod member pivotally mounted to said frame member to pivot about an axis generally parallel to said spool axis, said rod having a first side extending from said pivot axis to a signal and a second side extending from said pivot axis to a free end;
   a weight secured to said free end and urging said rod to pivot to a signal position with said signal disposed above said reel;
   a plurality of readily displaced hooks disposed on said reel and presenting radial openings; and
   a pin secured to said rod and sized to extend through one of said openings from a side thereof opposite an unwinding direction of rotation of said reel when said rod is in a second position.

6. A fishing rig according to claim 5 wherein said frame member is provided with a handle portion disposed to be engaged by a hand of an operator;
   said frame and said base member being formed of a lightweight material with said rig freely wheelable by an operator engaging said handle portions and;
   a crank handle secured to said reel and engageable by a free hand of an operator wielding said rig.

7. A fishing rig according to claim 5 wherein said weight is disposed opposing a surface of said frame with said rod pivoted to said signal position.

* * * * *